United States Patent [19]

Kreck

[11] 4,381,069
[45] Apr. 26, 1983

[54] OUTBOARD MOTOR CARRIER FOR MOTOR VEHICLE

[76] Inventor: Steven C. Kreck, 709 N. Phillips, Carson City, Nev. 89701

[21] Appl. No.: 377,745

[22] Filed: May 13, 1982

Related U.S. Application Data

[63] Continuation of Ser. No. 189,516, Sep. 22, 1980, abandoned.

[51] Int. Cl.³ .............................................. B60R 9/08
[52] U.S. Cl. .......................... 224/42.44; 224/42.03 R; 224/42.08; 224/42.45 R
[58] Field of Search ...................... 224/42.44, 42.03 R, 224/42.08, 42.45 R, 42.03 A, 42.03 B, 42.04, 224/42.05, 42.06, 42.07, 42.32

[56] References Cited

U.S. PATENT DOCUMENTS

| | | | |
|---|---|---|---|
| 2,592,050 | 4/1952 | McCharen | 224/42.03 R |
| 2,762,542 | 9/1956 | Hodgeman | 224/42.03 R |
| 2,836,863 | 6/1958 | Denker | 428/133 X |
| 3,822,814 | 7/1974 | Baldi | 224/42.06 |
| 3,913,811 | 10/1975 | Spencer | 224/42.08 |
| 4,084,736 | 4/1978 | Jacobs, Jr. | 224/42.08 X |
| 4,136,806 | 1/1979 | Wisz | 224/42.03 R X |
| 4,241,858 | 12/1980 | Lawroski | 224/42.03 R X |

*Primary Examiner*—Allan N. Shoap
*Attorney, Agent, or Firm*—Nilsson, Robbins, Dalgarn, Berliner, Carson & Wurst

[57] ABSTRACT

A rigid metal support arm is pivotally mounted at its lower end in a bracket secured to an appropriate external structure, such as a trailer hitch, on a vehicle. The bracket has a metal channel affixed to extend upwardly at an angle from the vertical to receive the lower end of the pivoted support arm that is secured in the channel with a locking pin or the like. The upper end of the support arm is angled backward in the opposite direction and supports a flat metal plate that is covered on both sides with attached flat wooden sheets to serve like a transom for attaching the clamps of an outboard motor. With the locking pin removed, the arm can be pivoted out of engagement in the channel and downwardly to permit the clamps to be attached to the transom while the motor rests on the ground. With the motor attached, the arm is pivoted upwardly to be locked in position in the channel so that the weight of the motor is over the support bracket.

3 Claims, 3 Drawing Figures

OUTBOARD MOTOR CARRIER FOR MOTOR VEHICLE

This is a continuation of application Ser. No. 189,516, filed Sept. 22, 1980 now abandoned.

BACKGROUND OF THE INVENTION

1. Field of the Invention

This invention relates to a pivoted metal arm and bracket arrangement that permits an outboard motor to be transported securely and safely on the exterior of a motor vehicle.

2. Prior Art

Presently nothing is available to facilitate the transport of small outboard motors by a motor vehicle. Typically fisherman and small boat users simply load their outboard motors into the trunk of the automobile or place them on the floor inside a camper where hazardous and unpleasant smelling gasoline fumes can accumulate. Even without gas in the motor, these fumes can come from residual fuel left in the carburetors after use.

Moreover, the motor is generally placed in the vehicle without securing it in place so that a sudden stop or swerve can cause it to topple over or slide around, resulting in damage to the motor and the interior of the vehicle. Other problems can arise from the physical strain and possible injury in trying to load these heavy motors into awkward, restricted spaces such as an automobile trunk, and the motor takes up valuable cargo space that may be needed for suitcases or other supplies on a trip.

SUMMARY OF THE INVENTION

A metal bracket is secured to a convenient structural support on the vehicle exterior, such as a trailer hitch bar. The bracket has a metal channel that extends upwardly at an angle to receive the lower end of an elongated, rigid support arm. The arm is pivotally mounted at the bottom of the channel so that it can be rotated out of the channel and downwardly to permit mounting of the motor. The upper end of the arm angles backward in the other direction and has secured to it a rigid metal plate with wooden sheets covering both faces to act as a transom for securing the clamps of the outboard motor. With the arm in the downward position, the motor clamps can be secured to the transom with the motor resting on the ground so that the arm can then be pivoted upwardly with the motor attached to be locked in its upright position within the channel using a locking pin or the like. In that position, the weight of the motor is supported over the mounting bracket.

In the preferred embodiment, the mounting bracket consists of a short section of square metal tubing that can be slid onto the steel bar supporting a conventional trailer hitch on the vehicle. The support arm is pivoted to rotate downwardly towards one side of the vehicle and the transom extends back from the upper end of the arm. With the motor so mounted on the back of the vehicle, the vehicle interior and trunk space are left free for other uses, and there is no interference with the normal function of trunk lids, tail gates, camper doors or towed trailers. In addition, the motor is safely and securely held in place using a simple low cost construction that makes it easily affordable.

DETAILED DESCRIPTION

Figure 1:
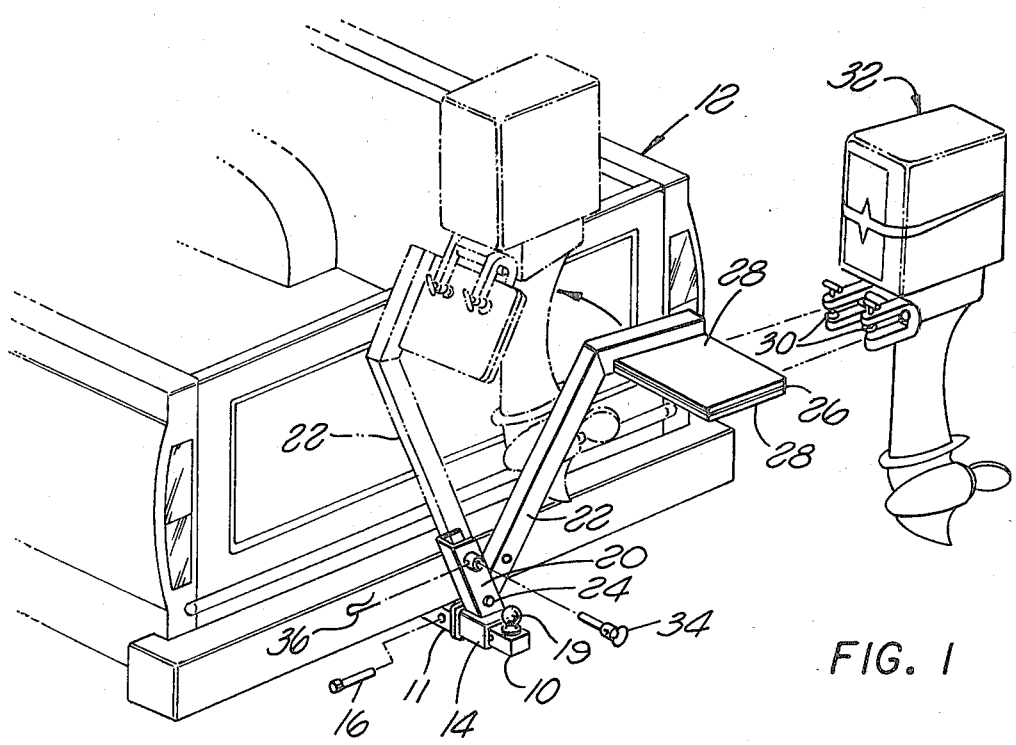
FIG. 1 is a perspective view showing a preferred form of the outboard motor carrier shown mounted on a permanently attached trailer hitch on the back of a pickup truck with alternative positions of the pivoted supporting arm and motor shown in full and broken lines.
Figure 2:
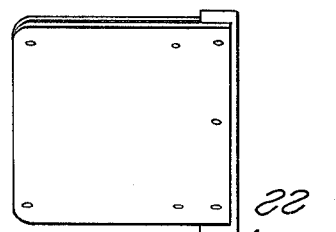
FIG. 2 is a full side elevational view of the motor support structure and trailer hitch bar with the bottom portion shown in section; and, FIG. 3 is a full sectional view of the bottom portion of the motor carrier assembly taken along the line 3—3 of FIG. 2.
Figure 3:
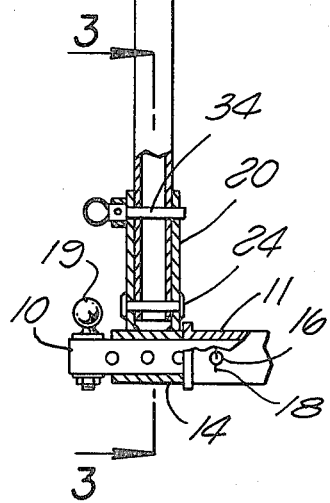
Figure 3:
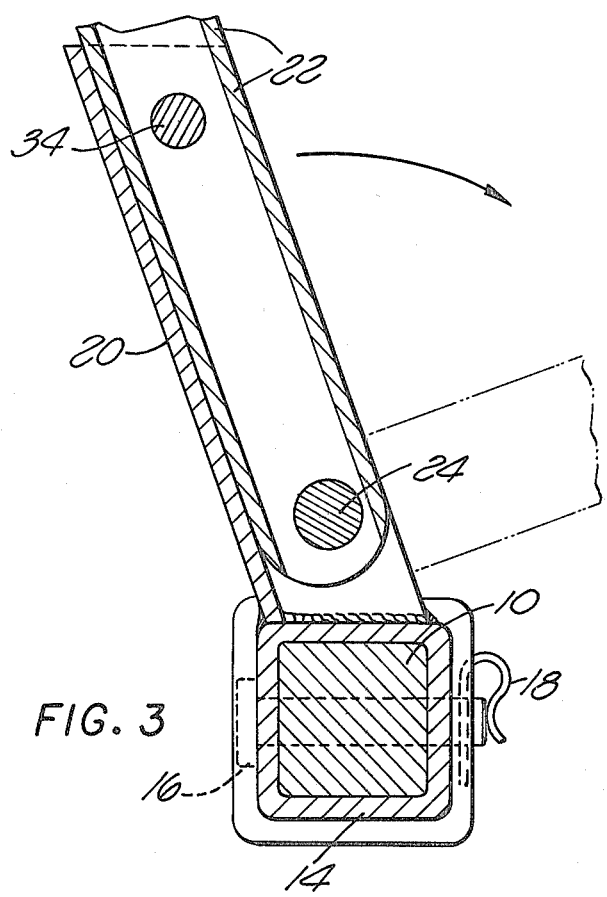

Referring now to the figures, the preferred form of the outboard motor carrier of this invention is designed for use on a conventional trailer hitch bar 10 that is inserted into a receiver assembly 11 permanently affixed to the undercarriage on the rear of a vehicle such as a pickup truck 12. The support bracket consists of a square metal sleeve 14 with inside dimensions like the receiver that match the outside dimensions of the trailer hitch bar 10. For example, the bracket sleeve 14 may consist of square steel tubing with a two-inch inside dimension to fit a conventional two-inch square trailer hitch bar. A locking pin 16 is inserted through matching holes drilled through the opposite side walls of the receiver 11 to register with a hole through the trailer hitch bar 10 to prevent its sliding out, and a cotter pin 18 through a hole at the end of the locking pin 16 maintains it in place. The sleeve 14 is held in place between the flange on the outer end of the receiver 11 and the knob 19 on the end of the hitch bar 10.

A short length of steel channel 20 is welded to the top of the supporting sleeve 14 to extend upward at an angle to one side. The channel 20 has a rectangular inner diameter for receiving the bottom portion of a rigid metal supporting arm 22 made of square steel tubing that is pivotally mounted at its bottom end on a pivot pin 24 extending between the side walls of the channel 20. Alternatively, the arm 22 may be made of steel channel or round tubing that conforms to the dimensions of the stationary channel 20. As shown in FIG. 1, the support arm 22 pivots sideways on the pivot pin 24 from an upright position within the sleeve downwardly in a vertical plane across the back of the vehicle.

The upper end of the supporting arm 22 is welded to the top of the lower section, or a single elongated steel bar may be bent while hot, to angle backward in the other direction. Attached to the backwardly angled upper portion is a steel plate 26 with wooden sheets 28 affixed to either side by an appropriate adhesive or fasteners to be like the transom on a boat permitting the clamps 30 on the outboard motor 32 to bite into the wood for a secure hold.

In mounting the motor, the supporting arm 22 can be pivoted downwardly on the pivot pin 24 to a position where the motor 32 clamps 30 can be secured to the transom arrangement while the weight of the motor rests on the ground. With the clamps 30 secured to the transom, the user can then lift the motor 32 by grasping its housing to pivot the supporting arm 22 into its upright position with the lower portion engaged within the channel 20. As the assembly is swung into the upright position, the motor is steadied by the pivoted supporting arm 22, and the weight of the motor 32 is gradually transferred onto the pivot pin 24 and bracket 14. When the support arm 22 reaches its full upright position with the lower part resting against the inner back wall of the channel 20, a locking pin 34 is inserted through holes provided in the channel sidewalls and in the supporting arm 22 to be secured with a cotter pin 36. In this position, the motor 32 is supported vertically with its center of gravity immediately above the supporting bracket 14 so as to minimize torquing forces produced by the vehicle bouncing while in motion.

The motor 32 is thus held safely and securely for transport on the outside of the vehicle 12 without taking up needed interior storage space or permitting dangerous and unpleasant accumulations of gasoline fumes within an enclosed space. As desired, the locking pin 34 may be released to permit the motor and supporting arm 22 to be pivoted downwardly out of the way to avoid interfering with the normal operation of and access to the truck tailgate or trunk lid on a car. When the motor is not to be carried, the entire carrier structure is easily removed simply by disengaging the locking pin 16 to permit the trailer hitch bar 10 to be slid out of the receiver assembly 11 and sleeve 14.

Although the preferred form of the invention has been described in relation to a particular bracket arrangement 14 used to engage a conventional trailer hitch bar 10, other bracket arrangements may be used for attachment to other parts of the vehicle, such as the bumper. The implementation of these other bracket arrangements capable of being attached to the different vehicle structures should be apparent to those skilled in the art.

What is claimed is:

1. A mounting structure for transporting an outboard motor on a motor vehicle comprising:
   a bracket means adapted to be securely attached to an external structure on a motor vehicle;
   a rigid metal channel extending upwardly at an angle from said bracket means;
   an elongated supporting arm mounted at its lower end to said channel with a lower portion above said lower end receivable into an upper opening in said channel to be supported in an upright position at said angle and a flat plate extending outwardly from its upper end to be engaged with the mounting clamps of an outboard motor; and,
   locking means for securing said lower portion of said supporting arm in its upright position within said channel, said supporting arm having said upper end angled obtusely to said supporting arm so that the outboard motor clamped to said plate is held vertically with its center of gravity above the bracket means when said supporting arm is in said upright position, said flat plate extending in a plane at the same obtuse angle to said supporting arm as said upper end.

2. The mounting structure of claim 1 wherein:
   said flat plate comprises a flat metal plate permanently affixed to the upper end of said supporting arm with flat wooden sheets affixed to either side to act like a boat transom for securing the outboard motor clamps.

3. The mounting structure of claim 2 wherein:
   said bracket means consists of a length of square steel tubing having an inside dimension for slidable insertion over a conventional trailer hitch bar affixed to the rear of a motor vehicle.

* * * * *